F. WILL.

COOKING STOVE.

No. 11,563. Reissued Aug. 18, 1896.

Witnesses;

Thomas Durant

Wallace Murdock

Inventor,

Frederick Will, by Munn & Munn his Atty's.

THE NORRIS PETERS CO., PHOTO-LITHO., WASHINGTON, D. C.

UNITED STATES PATENT OFFICE.

FREDERICK WILL, OF ROCHESTER, NEW YORK.

COOKING-STOVE.

SPECIFICATION forming part of Reissued Letters Patent No. 11,563, dated August 18, 1896.

Original No. 558,626, dated April 21, 1896. Application for reissue filed July 6, 1896. Serial No. 598,255.

*To all whom it may concern:*

Be it known that I, FREDERICK WILL, of Rochester, in the county of Monroe and State of New York, have invented certain new and useful Improvements in Cooking-Stoves; and I do hereby declare the following to be a full, clear, and exact description of the same, reference being had to the accompanying drawings, forming a part of this specification, and to the reference-numerals marked thereon.

My present invention relates to cooking stoves or ranges, and has for its object particularly to improve the construction and arrangement of the flues, whereby the oven will be evenly heated, and also in the arrangement of dampers for governing and controlling the heated air and products of combustion, all as will be hereinafter fully described, and the novel features pointed out particularly in the claims at the end of this specification.

Figure 1:
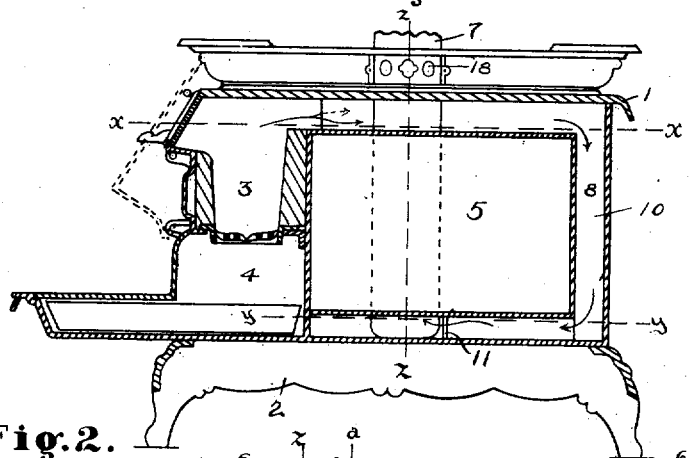
Figure 2:
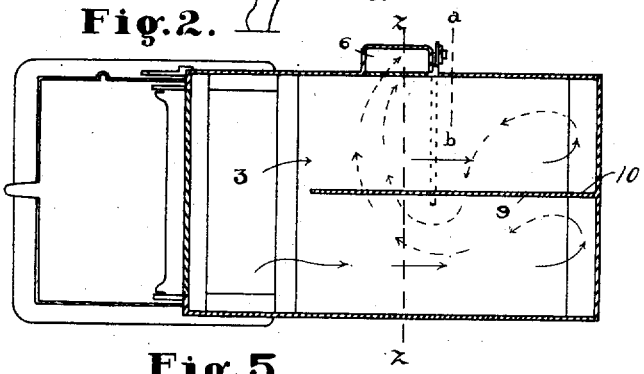
Figure 3:
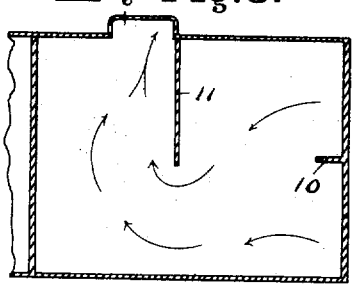
Figure 5:
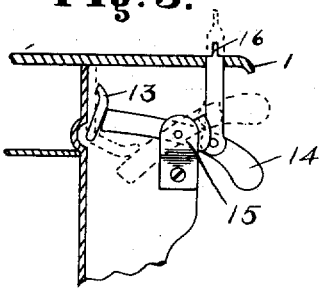
Figure 4:
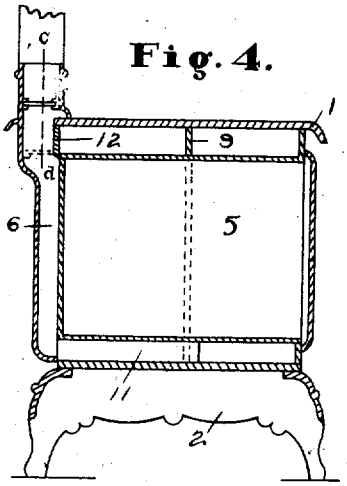
Figure 6:
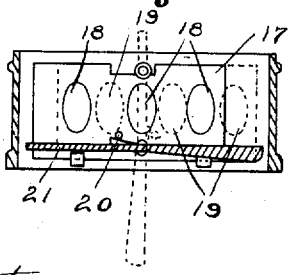

In the accompanying drawings, Figure 1 is a longitudinal sectional view of a stove provided with my improvements; Fig. 2, a sectional view on the line *x x* of Fig. 1; Fig. 3, a sectional view on the line *y y* of Fig. 1; Fig. 4, a sectional view on the line *z z* of Figs. 1 and 2; Fig. 5, a sectional view on the line *a b* of Fig. 2; Fig. 6, a sectional view on the line *c d* of Fig. 4.

Similar reference-numerals in the several figures indicate similar parts.

The outer casing 1 of the stove is constructed in the usual or any preferred manner and is provided with the usual base 2.

3 indicates the fire-pot, having a suitable grate, 4 the ash-pit, and 5 the oven.

At the rear end of the stove is arranged a vertical smoke-flue 6, connecting with the smoke-pipe 7, said flue 6 communicating with the flue or space beneath the oven, as usual in this style of stove. Arranged above the oven, and preferably extending from near the fire-pot to the diving-flue 8 at the end, is a partition or plate 9, connected with a plate or partition 10, extending from the top of said diving-flue 8 to the bottom of the same and terminating at the bottom of the stove, and arranged in the broad flue beneath the oven is a deflector-plate 11, extending from the rear of the stove at one side of the flue 6 to near the center of the oven, as shown in dotted lines in Fig. 2 and in full lines in Fig. 3.

The usual direct-draft damper 12 is employed in the rear flue 6 for opening communication between the space above the oven and said flue 6 when the direct draft is desired, as in starting a fire, and when said damper is closed the products of combustion from the fire-pot will divide, pass on each side of the central upper partition 9, down the diving-flue on each side of partition 10, thence under the oven and around the deflector 11 into the vertical flue 6 at the rear of the stove, as shown particularly by the arrows in Figs. 2 and 3. This arrangement will cause the oven to be evenly heated and will prevent the products from taking such a course as to heat one corner of the oven unduly, leaving the other parts cool or indifferently heated, as is the case where stoves with ordinary sheet-flues are employed using only a deflector, such as 11, at the bottom of the stove beneath the oven.

The direct-draft damper 12 may be manipulated in any suitable manner; but I prefer to employ such an arrangement as is shown in Fig. 5, in which an arm 13 on the end of the damper is engaged by the end of the lever 14, pivoted on a bracket 15, said lever being operated from the top of the stove by a vertically-movable slide or pitman 16, the operation of this arrangement of parts being shown in full and dotted lines in said figure.

In order to provide a check-damper which will simultaneously open communication between the smoke-pipe and the external air and close communication between the vertical flue 6 and the stove, I provide in the front of the smoke-pipe, or preferably in the collar or casting attached to the top of the stove, a sliding damper 17, having apertures 18 therein adapted to register with corresponding apertures 19 in the pipe or collar, as shown, and upon the rear side of said sliding damper I arrange a pin 20, coöperating with a damper 21, pivoted at or near its center, but weighted on the side opposite the pin, so that said damper will open by gravity to the position in dotted lines in Fig. 6 when the apertures in the slide and pipe are closed, but when the slide is moved to open said apertures the damper will be turned to a horizontal position, as shown in full lines, shutting off the draft to the smoke-pipe. Instead of the means shown for causing the simultaneous operation of these two dampers other means will readily suggest themselves to those skilled in the art.

I claim as my invention—

1. In a cooking-stove, the combination with the oven, the fire-pot at one end thereof, the broad flues at the top, end and bottom of the oven, the partitions 9 and 10 in said top and end flues, the deflector 11 in the bottom flue, the smoke-flue 6 opening into the bottom flue at one side of the partition 11, the aperture between the smoke-flue 6 and the top flue and the damper 12 controlling it, substantially as described.

2. In a stove, the combination with the smoke-pipe having the apertures therein, of the weighted damper 21 pivoted at or near its middle in the pipe, below the apertures, the sliding damper 17 movable laterally on the pipe and having apertures adapted to register with those in the latter, said sliding damper engaging the damper 21 above its pivot whereby when the sliding damper is open admitting air to the pipe above the pivoted damper, the latter will close the flue and vice versa, substantially as described.

FREDERICK WILL.

Witnesses:
F. F. CHURCH,
THOMAS DURANT.